United States Patent Office 3,445,658
Patented May 20, 1969

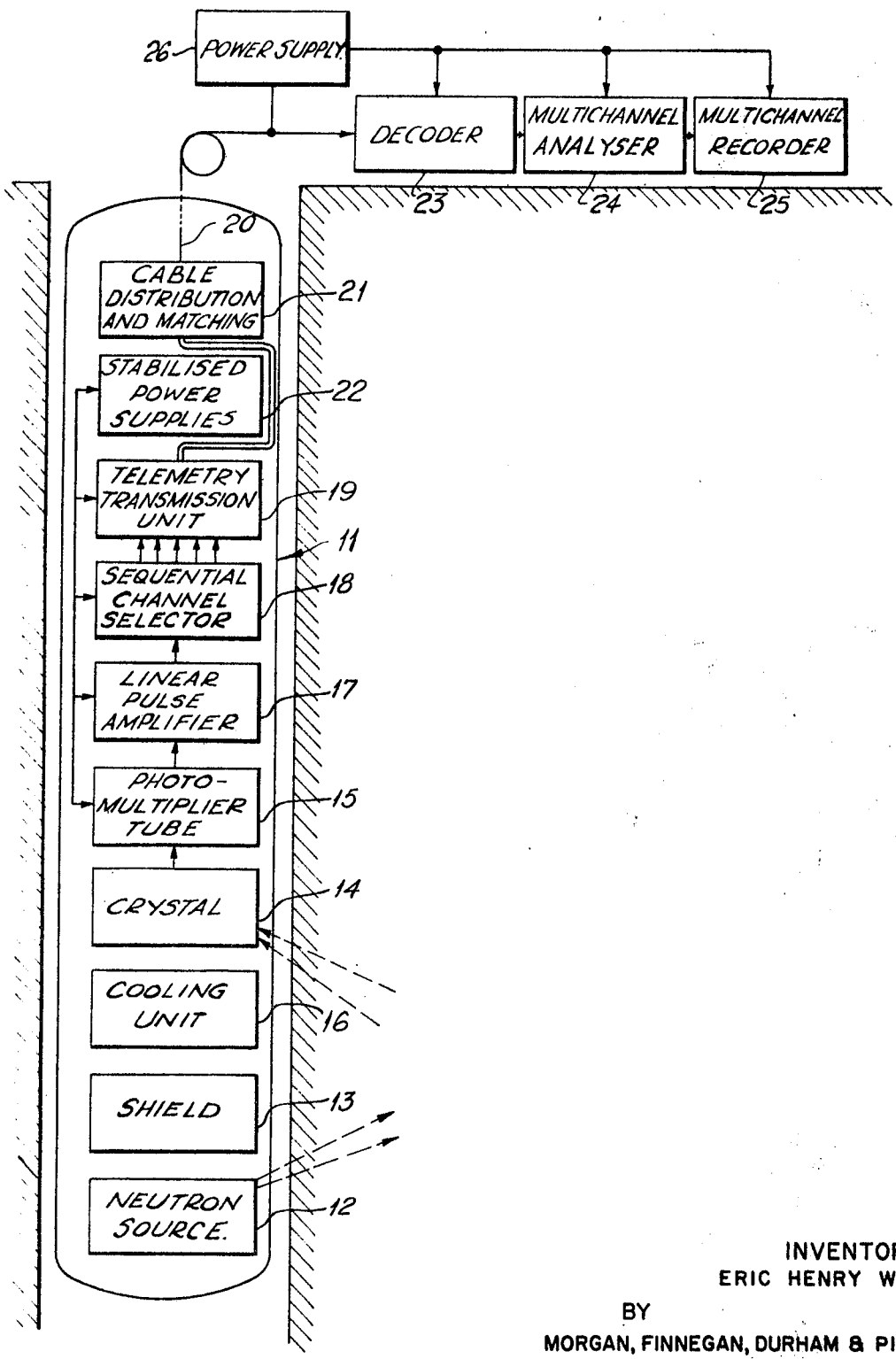

3,445,658
METHOD AND APPARATUS FOR LOGGING BOREHOLES USING TIME POSITION TELEMETRY
Eric Henry Ward, Sunbury-on-Thames, England, assignor to British Petroleum Company Limited, London, England, a British joint-stock company
Filed Dec. 17, 1963, Ser. No. 331,241
Claims priority, application Great Britain, Jan. 10, 1963, 1,164/63
Int. Cl. G01t *1/20;* H01j *39/18*
U.S. Cl. 250—71.5                                    9 Claims This invention relates to a method of, and apparatus for, logging boreholes, particularly to radioactive logging techniques.

When carrying out a spectrographic analysis of the radiations emitted by the formations or fluids contained in the formations surrounding a borehole, it is usually necessary to transmit the required information concerning the number and energy spectrum of the emitted photons up the logging cable, in the form of electrical pulses having amplitudes corresponding to the discrete energy levels of the original photons. The presence of the long logging cable between the detector down the borehole and the surface equipment causes degradation of the characteristics of the transmitted pulses, resulting in an insufficient degree of resolution by the surface equipment, of groups of pulses originally having small amplitude differences.

It is an object of the present invention to overcome the above-mentioned difficulty.

According to one aspect of the present invention we provide a method of logging a borehole comprising running a logging sonde down the borehole, detecting gamma photons emitted as a result of natural or induced disintegration of atomic nuclei of the materials in the vicinity of a detector in the sonde, producing electrical pulses having amplitudes corresponding to the energy distribution of the detected gamma photons, producing groups of time multiplexed pulses position modulated according to the original pulse amplitude distribution and transmitting the groups of time multiplexed position modulated pulses via a cable to surface equipment whereby the difficulty due to degradation of individual pulse characteristics by the cable is substantially overcome.

The groups of time multiplexed position modulated pulses may be converted at the surface equipment to groups of pulses having amplitudes corresponding to the original pulse amplitude distribution, determining said original pulse amplitude distribution of the groups of pulses and utilising these groups of pulses to produce a display of the energy spectrum of the gamma photons detected.

A further display may be produced of the total number of gamma photons detected.

The displays may be produced in the form of permanent records.

According to another aspect of the invention we provide a logging sonde comprising means for detecting gamma photons emitted as a result of natural or induced disintegration of atomic nuclei of materials in the vicinity of the sonde detector, means for producing electrical pulses having amplitudes corresponding to the energy distribution of the gamma photons, means for producing groups of time multiplexed pulses, position modulated according to the original pulse amplitude distribution, and means for transmitting the groups of time multiplexed position modulated pulses via a cable to surface equipment, whereby the difficulty due to degradation of individual pulse characteristics by the cable is substantially eliminated.

The sonde may include a radioactive source for irradiation of the formation past which the sonde moves in use.

The said electrical pulses may be amplified by a linear pulse amplifier prior to the production of the groups of time multiplexed position modulated pulses.

The surface equipment may include means for converting the groups of time multiplexed position modulated pulses to corresponding groups of pulses of amplitudes corresponding to said original pulse amplitude distribution, means for determining said original pulse amplitude distribution of the groups of pulses, and means for utilising these groups of pulses for producing a display of the energy spectrum of the gamma photons detected.

The surface equipment may also include means for producing a display of the total number of gamma photons detected.

The surface equipment may further include means for producing a permanent record of these displays.

In order that the invention can be more clearly understood a specific embodiment thereof will hereinafter be described, by way of example only, with reference to the drawing which shows a diagrammatic representation of a sonde with associated surface equipment.

Referring now to the drawing there is shown a sonde 11 provided at its lower extremity with a neutron source 12 for irradiating the formations past which the sonde 11 is run. The rest of the sonde is shielded from the neutron source 12 by a lead shield 13.

Gamma photons, emitted from the formations as a result of induced disintegration of atomic nuclei of the formations, are detected by a sodium iodide crystal 14 together with a photomultiplier 15 which produces electrical pulses having amplitudes corresponding to the energy distribution of the detected gamma photons. The crystal 14 and photomultiplier 15 are maintained below a predetermined temperature by a cooling unit 16.

The electrical pulses produced by the photomultiplier 15 are amplified by a linear pulse amplifier 17 and then passed to a sequential channel selector 18.

The sequential channel selector 18 comprises a number of gates for gating the electrical pulses into respective channels of a telemetry transmission unit 19.

The telemetry transmission unit 19 produces groups of time multiplexed pulses, position modulated according to the original pulse amplitude distribution, which are fed to a cable 20 via a distribution and matching unit 21.

A stabilised power supply unit 22 provides the various power supplies for the units contained in the sonde 11.

The groups of time multiplexed position modulated pulses are fed up the cable 20 to a decoding unit 23. The decoding unit 23 produces groups of electrical pulses having a pulse amplitude distribution which corresponds to the pulse amplitude distribution of the original pulses produced from photomultiplier 15.

The output from decoding unit 23 is fed to a multichannel pulse height analyser 24.

The output from the analyser 24 is fed to a multichannel recorder 25 which produces a record of the energy spectrum of the gamma photons detected and also of the total number of gamma photons detected.

Power supply unit 26 supplies power for the surface equipment units.

Suitable electronic circuitry for the telemetry transmission unit 19 and decoding unit 23 is shown in United Kingdom patent specification No. 900,467 and corresponding U.S. Patent No. 3,065,405 issued Nov. 20, 1962.

Although the embodiment described includes a neutron source this is by way of example only and it should be appreciated that any suitable source of radiation can be used. The invention also includes systems in which natural radioactivity of formations is detected.

We claim:
1. A method of logging a borehole comprising running a logging sonde down the borehole; detecting gamma photons emitted as a result of natural or induced disintegration of atomic nuclei of the materials in the vicinity of a single detector in the sonde; producing electrical pulses having amplitudes corresponding to the energy of the gamma photons respectively producing the pulses; gating said electrical pulses derived from said single detector as they occur into individual ones of a plurality of signal channels in a sequential manner; multiplexing said signal channels by time-division; position modulating said electrical pulses in said signal channels to produce pulses position modulated according to the amplitude of corresponding original electrical pulses; and transmitting the time-division multiplexed, position modulated pulses via a cable to surface equipment.

2. A method as claimed in claim 1, wherein the groups of time multiplexed position modulated pulses are converted at the surface equipment to further groups of pulses having amplitudes corresponding to the original pulse amplitudes, determining said original pulse amplitude distribution from the amplitude distribution of the further groups of pulses, and utilizing these further groups of pulses to produce a display of the energy spectrum of the gamma photons detected.

3. A method as claimed in claim 2, wherein a further display is produced of the total number of gamma photons detected.

4. A method as claimed in claim 2, wherein the display is produced in the form of a permanent record.

5. A logging sonde comprising a single radiation detector for detecting gamma photons emitted as a result of natural or induced distintegration of atomic nuclei of materials in the vicinity of the sonde; a pulse generator coupled to said single detector for producing electrical pulses having amplitudes corresponding to the energy of the gamma photons respectively producing the pulses; a channel sequencer coupled to said pulse generator for sequentially gating said pulses into a plurality of individual signal channels; a telemetry transmission unit coupled to said channel sequencer for position modulating the electrical pulses in said individual signal channels according to the amplitude of the corresponding original pulses and for multiplexing said position modulated pulses in said individual signal channels by time-division, and means coupled to said telemetry transmission unit for transmitting said time multiplexed, position modulated pulses via a cable to surface equipment.

6. A logging sonde as claimed in claim 5 which includes a linear pulse amplifier interconnected between said pulse generator and said channel sequencer and arranged to amplify the original amplitude pulses prior to the production of the groups of time multiplexed position modulated pulses.

7. A logging sonde as claimed in claim 5 and connected to surface equipment via said cable, said surface equipment including a decoder for converting the groups of time multiplexed position modulated pulses to corresponding further groups of pulses of amplitudes corresponding to said original pulse amplitudes, an analyzer coupled to said decoder for determining the original pulse amplitude distribution from the amplitude distribution of the further groups of pulses, and display means coupled to said analyzer for utilizing these further groups of pulses for producing a display of the energy spectrum of the gamma photons detected.

8. A logging sonde as claimed in claim 7, wherein said analyzer and display means of said surface equipment also includes means for producing a display of the total number of gamma photons detected.

9. A logging sonde as claimed in claim 7, wherein said display means of said surface equipment also includes a recorder for producing a permanent record of the display.

References Cited
UNITED STATES PATENTS

| | | | |
|---|---|---|---|
| 2,436,563 | 2/1948 | Frosch. | |
| 2,888,568 | 5/1959 | Jones et al. | 250—71.5 |
| 2,942,112 | 6/1960 | Hearn. | |
| 2,998,521 | 8/1961 | Rankin. | |
| 3,078,370 | 2/1963 | Monaghan | 250—71.5 X |
| 3,091,695 | 5/1963 | Peterson. | |
| 3,132,329 | 5/1964 | Penter | 340—206 X |

OTHER REFERENCES

Schwartz, M., Information Transmission, Modulation and Noise, McGraw-Hill, 1959, pp. 180–181, 166–169.

RALPH G. NILSON, *Primary Examiner.*

SAUL ELBAUM, *Assistant Examiner.*

U.S. Cl. X.R.

325—143; 340—18, 206